US009569819B2

(12) United States Patent
Lai et al.

(10) Patent No.: US 9,569,819 B2
(45) Date of Patent: Feb. 14, 2017

(54) CODING OF DEPTH MAPS

(75) Inventors: Po-Lin Lai, Richardson, TX (US);
Dong Tian, Plainsboro, NJ (US)

(73) Assignee: THOMSON LICENSING, Issy les Moulineaux (FR)

( * ) Notice: Subject to any disclaimer, the term of this patent is extended or adjusted under 35 U.S.C. 154(b) by 1106 days.

(21) Appl. No.: 13/138,205

(22) PCT Filed: Jan. 27, 2010

(86) PCT No.: PCT/US2010/000208
§ 371 (c)(1),
(2), (4) Date: Jul. 20, 2011

(87) PCT Pub. No.: WO2010/087955
PCT Pub. Date: Aug. 5, 2010

(65) Prior Publication Data
US 2011/0273529 A1    Nov. 10, 2011

Related U.S. Application Data

(60) Provisional application No. 61/206,496, filed on Jan. 30, 2009.

(51) Int. Cl.
*H04N 13/00* (2006.01)
*G06T 5/00* (2006.01)
(Continued)

(52) U.S. Cl.
CPC ............... *G06T 5/002* (2013.01); *G06T 5/20* (2013.01); *G06T 5/50* (2013.01); *H04N 13/0018* (2013.01);
(Continued)

(58) Field of Classification Search
CPC .................... H04N 13/0018; H04N 19/00769; H04N 19/00781; G06T 5/20; G06T 5/50; G06T 5/002
(Continued)

(56) References Cited

U.S. PATENT DOCUMENTS 8,411,205 B2 *  4/2013  Sasaki ........................ 348/620
2005/0163224 A1  7/2005  Shin et al.
(Continued)

FOREIGN PATENT DOCUMENTS

CN    1313712 A    9/2001
CN    1906946 A    1/2007
(Continued)

OTHER PUBLICATIONS

Bharwani et al., "Refinement of Environmental Depth Maps Over Multiple Frames", 1986 IEEE, Massachusetts, 1986.
(Continued)

*Primary Examiner* — Neil Mikeska
(74) *Attorney, Agent, or Firm* — Brian J. Dorini; Lily Neff (57) ABSTRACT

Various implementations are described. Several implementations relate to filtering of depth maps. According to a general aspect, a first depth picture is accessed that corresponds to a first video picture. For a given portion of the first depth picture, a co-located video portion of the first video picture is determined. A video motion vector is accessed that indicates motion of the co-located video portion of the first video picture with respect to a second video picture. A second depth picture is accessed that corresponds to the second video picture. A depth portion of the second depth picture is determined, from the given portion of the first depth picture, based on the video motion vector. The given portion of the first depth picture is updated based on the depth portion of the second depth picture.

18 Claims, 9 Drawing Sheets

(51) Int. Cl.
*G06T 5/20* (2006.01)
*G06T 5/50* (2006.01)
*H04N 19/597* (2014.01)
*H04N 19/61* (2014.01)

(52) U.S. Cl.
CPC ............ *H04N 19/597* (2014.11); *H04N 19/61* (2014.11); *G06T 2207/10012* (2013.01); *G06T 2207/10016* (2013.01); *G06T 2207/20012* (2013.01); *G06T 2207/20032* (2013.01); *G06T 2207/20182* (2013.01)

(58) Field of Classification Search
USPC ........ 348/42, 43; 345/419, 622; 375/240.16, 375/240.27; 382/154
See application file for complete search history.

(56) References Cited

U.S. PATENT DOCUMENTS

| | | |
|---|---|---|
| 2007/0103546 A1 | 5/2007 | Collender et al. |
| 2007/0274687 A1 | 11/2007 | Varekamp et al. |
| 2008/0084934 A1* | 4/2008 | Agrawal ................. 375/240.27 |
| 2009/0324059 A1* | 12/2009 | Boughorbel ................. 382/154 |
| 2010/0194856 A1* | 8/2010 | Varekamp ....................... 348/42 |
| 2010/0284466 A1* | 11/2010 | Pandit et al. ............. 375/240.16 |
| 2011/0110583 A1* | 5/2011 | Zhang et al. ................. 382/154 |
| 2011/0261050 A1* | 10/2011 | Smolic et al. ................ 345/419 |
| 2012/0106803 A1* | 5/2012 | Lee ......................... G01S 17/50 382/107 |
| 2013/0009952 A1* | 1/2013 | Tam et al. ..................... 345/419 |
| 2014/0176675 A1* | 6/2014 | Nagasawa et al. ............. 348/43 |

FOREIGN PATENT DOCUMENTS

| | | |
|---|---|---|
| CN | 1926879 A | 3/2007 |
| CN | 101374243 | 2/2009 |
| JP | 2001175863 | 6/2001 |
| JP | 2004229093 A | 8/2004 |
| WO | 2004014086 A1 | 2/2004 |
| WO | 2007038702 A1 | 4/2007 |
| WO | 2008016882 A1 | 2/2008 |
| WO | 2008062351 A1 | 5/2008 |
| WO | 2008139351 A1 | 11/2008 |
| WO | WO2009013682 | 1/2009 |

OTHER PUBLICATIONS

Tian et al. "View Synthesis Techniques for 3D Video".
Falkenhagen, "3D Object-Based Depth Estimation From Stereoscpic Image Sequences", Hannover, Germany.
Gong et al., "Real-Time Joint Disparity and Disparity and Disparity Flow Estimation on Programmable Graphics Hardware", Computer Vision and Image Understanding, vol. 113, No. 1, Jan. 1, 2009, pp. 90-100.
Grewatsch et al., "Sharing of Motion Vectors in 3D Video Coding", 2004 International Conference on Image Processing (ICIP), 2004 IEEE, Rostock, Germany, 2004.
Grewatsch et al., "Evaluation of Motion Compensation and Coding Strategies for Compression of Depth Map Sequences", Mathematics of Data/Image Coding, Compression, and Encryption VII, with Applications, Proc. of SPIE, vol. 5561, Bellingham, WA, 2004.
Huang et al., "A Layered Method of Visibility Resolving in Depth Image-Based Rendering", 19th International Conference on Pattern Recognition, 2008, ICPR 2008, Tampa, Florida, Dec. 8-11, 2008, pp. 1-4.
Ideses et al., "Depth Map Manipulation for 3D Visualization", 3DTV-CON'08, 2008 IEEE, Istanbul, Turkey, May 28-30, 2008.
Leung et al., "An Energy Minimisation Approach to Stereo-Temporal Dense Reconstructin", Pattern Recognition, 2004, ICPR 2004, Proceedings ofthe 17th International Conference on Cambridge, UK, vol. 4, Aug. 23, 2004, pp. 72-75.
Matthies et al., "Kalman Filter-Based Algorithms for Estimating Depth from Image Sequences", International Journal of Computer Vision, 3, 1989, pp. 209-236.
Sibley et al., "The Iterated Sigma Point Kalman Filter with Applications to Long Range Stereo", California.
Strecha, "Motion-Stereo Integration for Depth Estimation", Lecture Notes in Computer Science, vol. 2351/2002, Jan. 1, 2002, pp. 495-497.
Tao et al., "Dynamic Depth Recovery from Multiple Synchronized Video Streams", Proceedings 2001 IEEE Conference on Computer Vision and Pattern Recognition, CVPR 2001, vol. 1, Kauai, Hawaii, Dec. 8-14, 2001, pp. 118-124.
Search Report Dated May 25, 2010.

* cited by examiner

Frame 5

FIG. 9

Frame 10

FIG. 10

Frame 15

FIG. 11

Frame 5

FIG. 12

Frame 10

FIG. 13

Frame 15

FIG. 14

CODING OF DEPTH MAPS

CROSS-REFERENCE TO RELATED APPLICATIONS

This application claims the benefit, under 35 U.S.C. §365 of International Application PCT/US2010/000208, filed Jan. 27, 2010, which was published in accordance with PCT Article 21(2) on Aug. 5, 2010 in English and which claims the benefit of U.S. provisional patent application No. 61/206,496, filed Jan. 30, 2009.

TECHNICAL FIELD

Implementations are described that relate to coding systems. Various particular implementations relate to coding of depth maps

BACKGROUND

Currently in many application systems, depth maps are obtained by depth estimation methods which find correspondence among different video views. Due to camera setting mismatches, different shooting positions, and depth estimation errors, the resulting depth maps may exhibit some artifacts. The use of such depth maps could lead to unacceptable rendering errors in generated virtual views.

SUMMARY

According to a general aspect, a first depth picture is accessed that corresponds to a first video picture. For a given portion of the first depth picture, a co-located video portion of the first video picture is determined. A video motion vector is accessed that indicates motion of the co-located video portion of the first video picture with respect to a second video picture. A second depth picture is accessed that corresponds to the second video picture. A depth portion of the second depth picture is determined, from the given portion of the first depth picture, based on the video motion vector. The given portion of the first depth picture is updated based on the depth portion of the second depth picture.

The details of one or more implementations are set forth in the accompanying drawings and the description below. Even if described in one particular manner, it should be clear that implementations may be configured or embodied in various manners. For example, an implementation may be performed as a method, or embodied as apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

To facilitate new video applications such as three-dimensional television (3DTV) and free-viewpoint video (FVV), a data format that includes multiple video views and the corresponding per-pixel depth maps is commonly used. The data format is referred to as the multi-view plus depth (MVD) format.

In at least one implementation, we propose performing temporal filtering across depth maps at different timestamps to improve the temporal consistency in the depth maps, as well as to remove the false contours in regions with flat depths or smoothly varying depths.

In at least one implementation, we propose to use the video information to identify correspondence among depth maps such that the filtering is applied to corresponding regions/objects across time.

The processed depth maps will typically have improved temporal consistency in static regions and they will have much less banding (false contours). These improvements should not only provide higher rendering quality for the virtual views rendered using the processed depth maps, but also enable higher depth coding efficiency as the depths for static regions become stable (benefits temporal prediction) and the false contours are removed (benefits spatial prediction).

Figure 1:
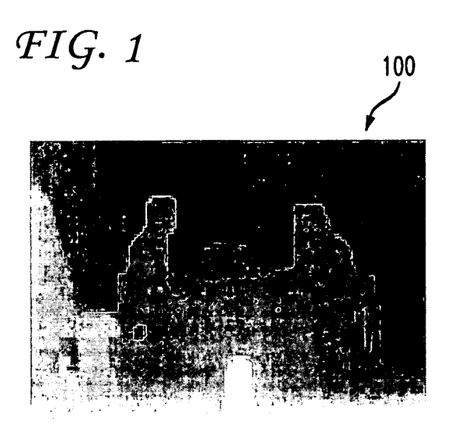
FIG. 1 is an example of a left depth map from a left reference view.
Figure 2:
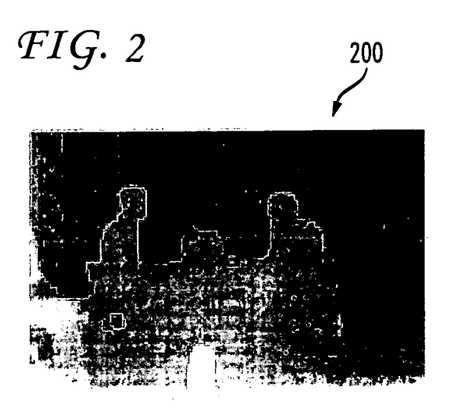
FIG. 2 is an example of a right depth map from a right reference view.

FIG. 1 shows an exemplary depth map generated for a sixth view corresponding to an MPEG test sequence known as "Leaving_Laptop", to which the present principles may be applied in accordance with an embodiment of the present principles. FIG. 2 shows an exemplary depth map generated for a ninth view corresponding to the MPEG test sequence known as "Leaving_Laptop", to which the present principles may be applied in accordance with an embodiment of the present principles. At the user end, intermediate video views (virtual views) can be generated using, for example, the techniques of depth image based rendering (DIBR), which takes the transmitted or stored video views (reference views) and the corresponding depth maps as input.

Figure 3:
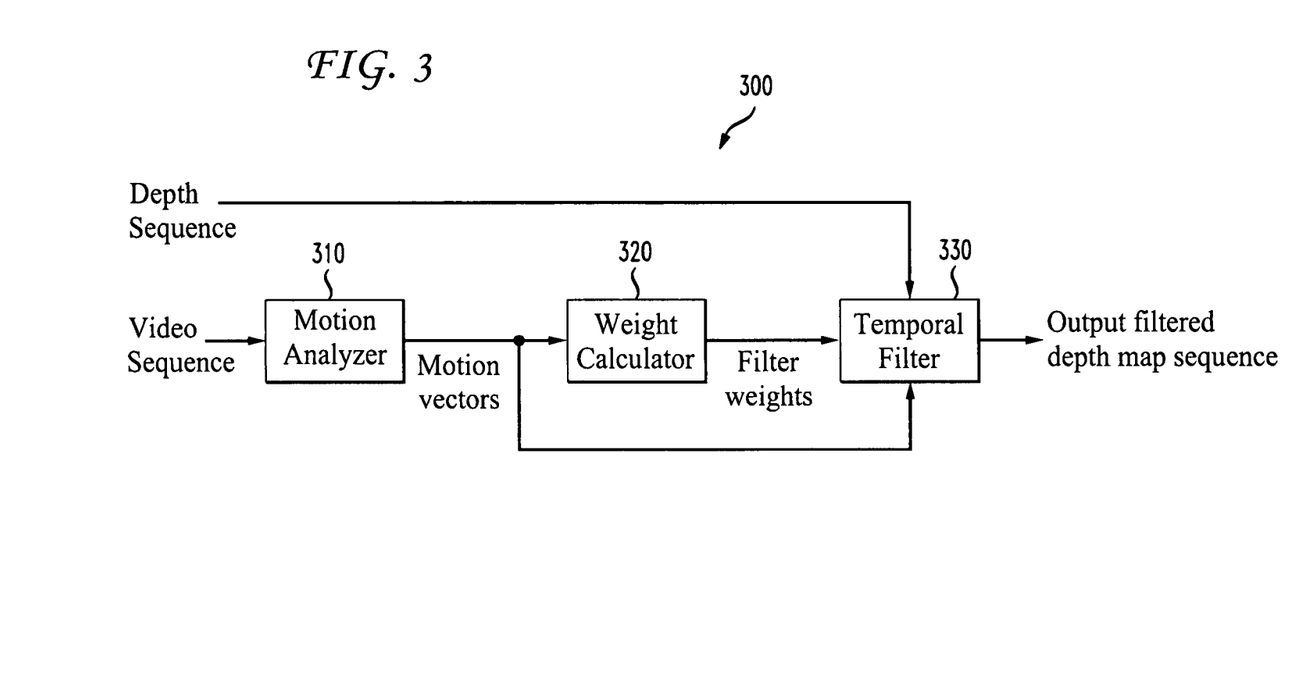
FIG. 3 is a diagram of an implementation of an apparatus for performing temporal filtering of depth maps.

FIG. 3 shows an exemplary apparatus 300 for performing temporal filtering of depth maps to which the present principles may be applied, in accordance with an embodiment of the present principles. The apparatus 300 includes a motion analyzer 310 having an output connected in signal communication with an input of a weight calculator 320 and a third input of a temporal filter 330, for providing motion vectors thereto. An output of the weight calculator 320 is connected in signal communication with a first input of the temporal filter 330, for providing filter weights thereto. An input of the motion analyzer 310 is available as an input of the apparatus 300, for receiving a video sequence. A second input of the temporal filter 330 is available as an input of the apparatus 300, for receiving a depth sequence. An output of the temporal filter 330 is available as an output of the apparatus 300, for outputting a filtered depth map sequence. The operation of the apparatus 300 is described in further detail herein below.

Implementations of FIG. 3, as well as other devices described in the application, may receive more than one input signal on a single input terminal or port. For example, implementations one or more of the temporal filter 330 may receive depth sequences, filter weights, and motion vectors on a single input port.

Figure 4:
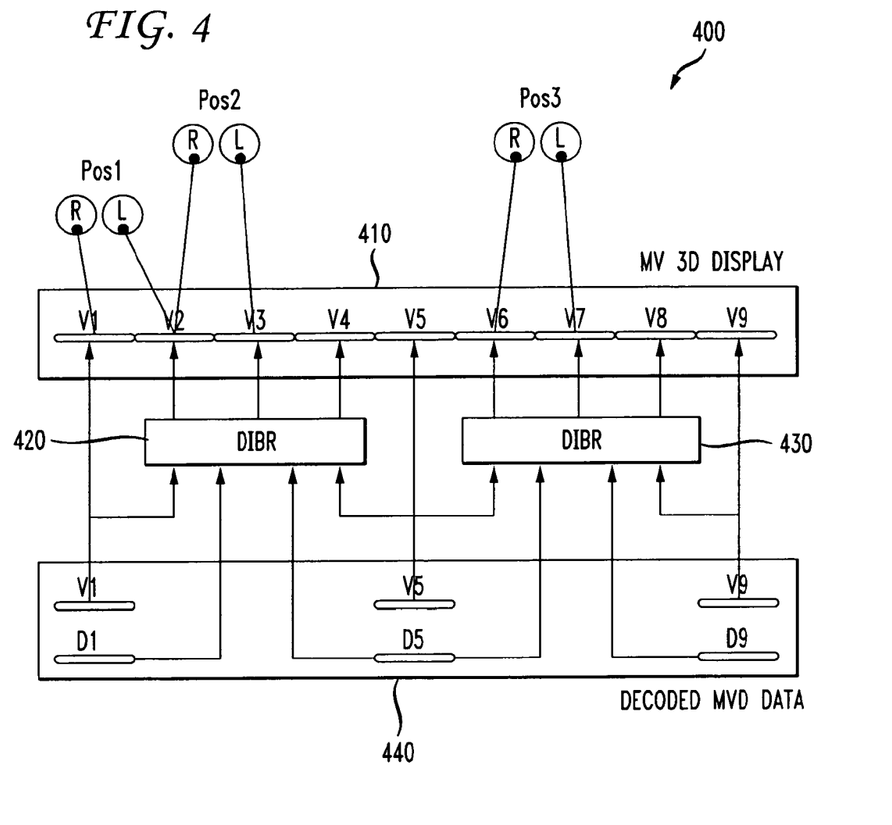
FIG. 4 is a diagram of an implementation of a framework for generating nine output views (N=9) out of 3 input views with depth (K=3).

FIG. 4 shows an exemplary framework 400 for generating nine output views (N=9) out of 3 input views with depth (K=3), to which the present principles may be applied, in accordance with an embodiment of the present principles. The framework 400 involves an auto-stereoscopic 3D display 410, which supports output of multiple views, a first depth image-based renderer 420, a second depth image-based renderer 430, and a buffer for decoded data 440. The decoded data is a representation known as Multiple View plus Depth (MVD) data. The nine views are denoted by V1 through V9. Corresponding depth maps for the three input views are denoted by D1, D5, and D9. Any virtual camera positions in between the captured camera positions (e.g., Pos 1, Pos 2, Pos 3) can be generated using the available depth maps (D1, D5, D9), as shown in FIG. 4. As can be seen in FIG. 4, the baseline between the actual cameras (V1, V5 and V9) used to capture data can be large. As a result, the correlation between these cameras is significantly reduced and coding efficiency of these cameras may suffer since the coding efficiency would rely on temporal correlation.

Figure 5:
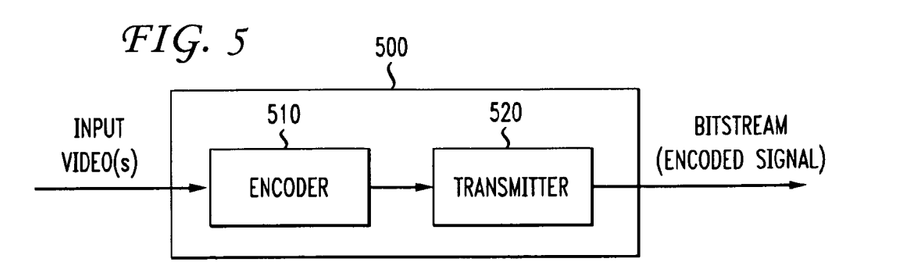
FIG. 5 is a diagram of an implementation of a video transmission system.

FIG. 5 shows an exemplary video transmission system 500, to which the present principles may be applied, in accordance with an implementation of the present principles. The video transmission system 500 may be, for example, a head-end or transmission system for transmitting a signal using any of a variety of media, such as, for example, satellite, cable, telephone-line, or terrestrial broadcast. The transmission may be provided over the Internet or some other network.

The video transmission system 500 is capable of generating and delivering compressed video with depth. This is achieved by generating an encoded signal(s) including depth information or information capable of being used to synthesize the depth information at a receiver end that may, for example, have a decoder.

The video transmission system 500 includes an encoder 510 and a transmitter 520 capable of transmitting the encoded signal. The encoder 510 receives video information and generates an encoded signal(s) with depth. The encoder 510 may include sub-modules, including for example an assembly unit for receiving and assembling various pieces of information into a structured format for storage or transmission. The various pieces of information may include, for example, coded or uncoded video, coded or uncoded depth information, and coded or uncoded elements such as, for example, motion vectors, coding mode indicators, and syntax elements.

The transmitter 520 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and/or modulating the signal onto one or more carriers. The transmitter may include, or interface with, an antenna (not shown). Accordingly, implementations of the transmitter 520 may include, or be limited to, a modulator.

Figure 6:
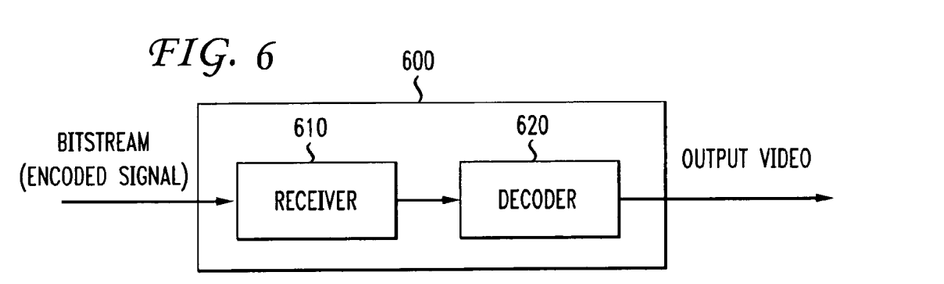
FIG. 6 is a diagram of an implementation of a video receiving system.

FIG. 6 shows an exemplary video receiving system 600 to which the present principles may be applied, in accordance with an embodiment of the present principles. The video receiving system 600 may be configured to receive signals over a variety of media, such as, for example, satellite, cable, telephone-line, or terrestrial broadcast. The signals may be received over the Internet or some other network.

The video receiving system 600 may be, for example, a cell-phone, a computer, a set-top box, a television, or other device that receives encoded video and provides, for example, decoded video for display to a user or for storage. Thus, the video receiving system 600 may provide its output to, for example, a screen of a television, a computer monitor, a computer (for storage, processing, or display), or some other storage, processing, or display device.

The video receiving system 600 is capable of receiving and processing video content including video information. The video receiving system 600 includes a receiver 610 capable of receiving an encoded signal, such as for example the signals described in the implementations of this application, and a decoder 620 capable of decoding the received signal.

The receiver 610 may be, for example, adapted to receive a program signal having a plurality of bitstreams representing encoded pictures. Typical receivers perform functions such as, for example, one or more of receiving a modulated and encoded data signal, demodulating the data signal from one or more carriers, de-randomizing the energy in the signal, de-interleaving the data in the signal, and/or error-correction decoding the signal. The receiver 610 may include, or interface with, an antenna (not shown). Implementations of the receiver 610 may include, or be limited to, a demodulator. The decoder 620 outputs video signals including video information and depth information.

Figure 7:
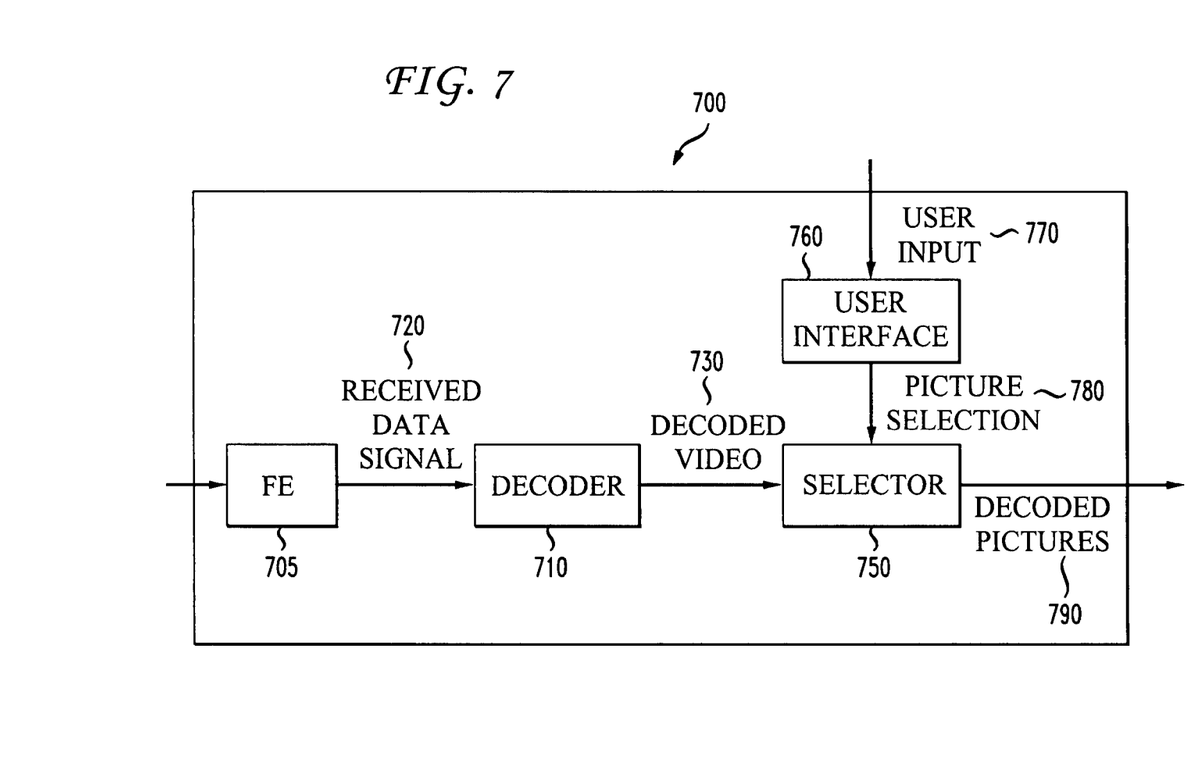
FIG. 7 is a diagram of an implementation of a video processing device.

FIG. 7 shows an exemplary video processing device 700 to which the present principles may be applied, in accordance with an embodiment of the present principles. The video processing device 700 may be, for example, a set top box or other device that receives encoded video and provides, for example, decoded video for display to a user or for storage. Thus, the video processing device 700 may provide its output to a television, computer monitor, or a computer or other processing device.

The video processing device 700 includes a front-end (FE) device 705 and a decoder 710. The front-end device 705 may be, for example, a receiver adapted to receive a program signal having a plurality of bitstreams representing encoded pictures, and to select one or more bitstreams for decoding from the plurality of bitstreams. Typical receivers perform functions such as, for example, one or more of receiving a modulated and encoded data signal, demodulating the data signal, decoding one or more encodings (for example, channel coding and/or source coding) of the data signal, and/or error-correcting the data signal. The front-end device 705 may receive the program signal from, for example, an antenna (not shown). The front-end device 705 provides a received data signal to the decoder 710.

The decoder 710 receives a data signal 720. The data signal 720 may include, for example, one or more Advanced Video Coding (AVC), Scalable Video Coding (SVC), or Multi-view Video Coding (MVC) compatible streams.

AVC refers more specifically to the existing International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "H.264/MPEG-4 AVC Standard" or variations thereof, such as the "AVC standard" or simply "AVC").

MVC refers more specifically to a multi-view video coding ("MVC") extension (Annex H) of the AVC standard, referred to as H.264/MPEG-4 AVC, MVC extension (the "MVC extension" or simply "MVC").

SVC refers more specifically to a scalable video coding ("SVC") extension (Annex G) of the AVC standard, referred to as H.264/MPEG-4 AVC, SVC extension (the "SVC extension" or simply "SVC").

The decoder 710 decodes all or part of the received signal 720 and provides as output a decoded video signal 730. The decoded video 730 is provided to a selector 750. The device 700 also includes a user interface 760 that receives a user input 770. The user interface 760 provides a picture selection signal 780, based on the user input 770, to the selector 750. The picture selection signal 780 and the user input 770 indicate which of multiple pictures, sequences, scalable versions, views, or other selections of the available decoded data a user desires to have displayed. The selector 750 provides the selected picture(s) as an output 790. The selector 750 uses the picture selection information 780 to select which of the pictures in the decoded video 730 to provide as the output 790.

In various implementations, the selector 750 includes the user interface 760, and in other implementations no user interface 760 is needed because the selector 750 receives the user input 770 directly without a separate interface function being performed. The selector 750 may be implemented in software or as an integrated circuit, for example. In one implementation, the selector 750 is incorporated with the decoder 710, and in another implementation, the decoder 710, the selector 750, and the user interface 760 are all integrated.

In one application, front-end 705 receives a broadcast of various television shows and selects one for processing. The selection of one show is based on user input of a desired channel to watch. Although the user input to front-end device 705 is not shown in FIG. 7, front-end device 705 receives the user input 770. The front-end 705 receives the broadcast and processes the desired show by demodulating the relevant part of the broadcast spectrum, and decoding any outer encoding of the demodulated show. The front-end 705 provides the decoded show to the decoder 710. The decoder 710 is an integrated unit that includes devices 760 and 750. The decoder 710 thus receives the user input, which is a user-supplied indication of a desired view to watch in the show. The decoder 710 decodes the selected view, as well as any required reference pictures from other views, and provides the decoded view 790 for display on a television (not shown).

Continuing the above application, the user may desire to switch the view that is displayed and may then provide a new input to the decoder 710. After receiving a "view change" from the user, the decoder 710 decodes both the old view and the new view, as well as any views that are in between the old view and the new view. That is, the decoder 710 decodes any views that are taken from cameras that are physically located in between the camera taking the old view and the camera taking the new view. The front-end device 705 also receives the information identifying the old view, the new view, and the views in between. Such information may be provided, for example, by a controller (not shown in FIG. 7) having information about the locations of the views, or the decoder 710. Other implementations may use a front-end device that has a controller integrated with the front-end device.

The decoder 710 provides all of these decoded views as output 790. A post-processor (not shown in FIG. 7) interpolates between the views to provide a smooth transition from the old view to the new view, and displays this transition to the user. After transitioning to the new view, the post-processor informs (through one or more communication links not shown) the decoder 710 and the front-end device 705 that only the new view is needed. Thereafter, the decoder 710 only provides as output 790 the new view.

The system 700 may be used to receive multiple views of a sequence of images, and to present a single view for display, and to switch between the various views in a smooth manner. The smooth manner may involve interpolating between views to move to another view. Additionally, the system 700 may allow a user to rotate an object or scene, or otherwise to see a three-dimensional representation of an object or a scene. The rotation of the object, for example, may correspond to moving from view to view, and interpolating between the views to obtain a smooth transition between the views or simply to obtain a three-dimensional representation. That is, the user may "select" an interpolated view as the "view" that is to be displayed.

For 3DTV and FVV applications, virtual views can be rendered using DIBR techniques which typically take multiple video views and the corresponding depth maps (such as MVD format) as input. Typically, the depth maps are obtained by depth estimation routines which establish pixel correspondence among video views by minimizing a certain matching cost. Since the depth values are estimated instead of being measured by active devices (such as range cameras), the depth maps are very likely to exhibit estimation errors, leading to poor rendering quality in the generated virtual views.

Figure 8:
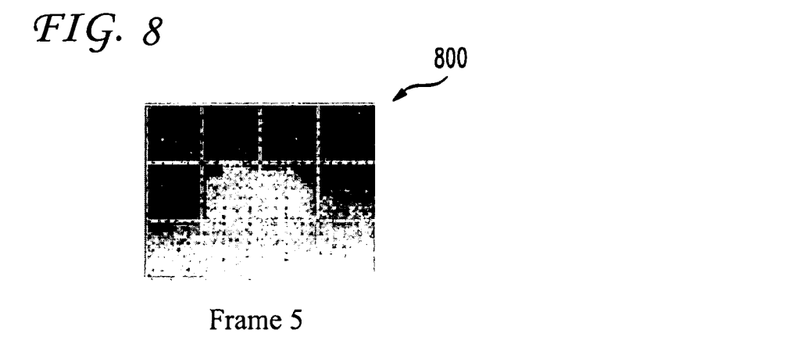
FIGS. 8, 9, and 10 are examples of depth maps at three different timestamps around the laptop region in the MPEG test sequence known as "Leaving_Laptop".
Figure 9:
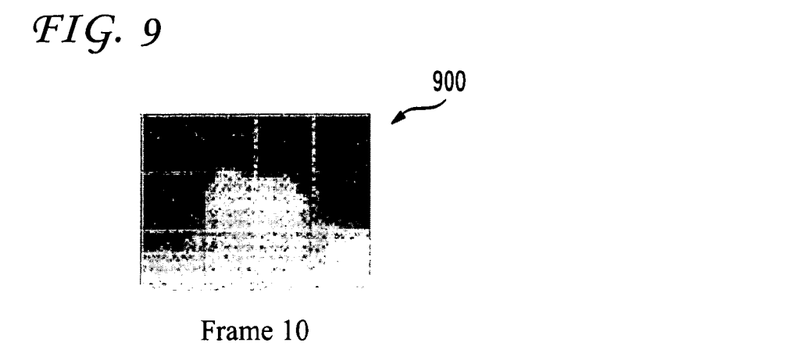
Figure 10:
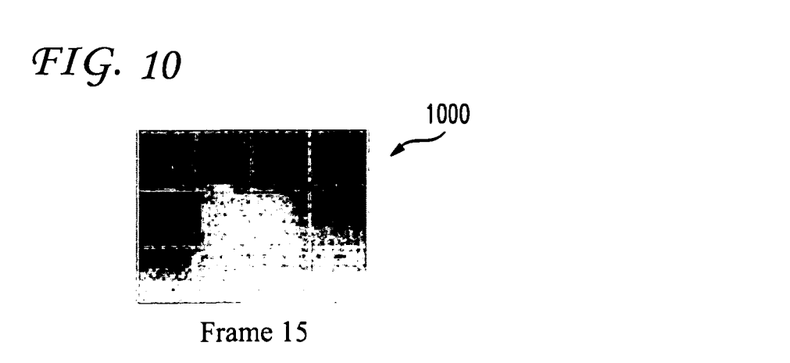

One possible artifact in the estimated depth maps is the temporal inconsistency in static regions. FIGS. 8, 9, and 10 show respective exemplary depth maps at three different timestamps around the laptop region in the MPEG test sequence known as "Leaving_Laptop". In particular, FIG. 8 shows an exemplary depth map 800 for frame 5, FIG. 9 shows an exemplary depth map 900 for frame 10, and FIG. 10 shows an exemplary depth map 1000 for frame 15 of the MPEG test sequence "Leaving_Laptop". As the depth estimation is performed on a frame-by-frame basis, no mechanism was developed to check temporal consistency (we refer to this as a "temporally independent depth map"). It can be observed that the laptop boundary and also its depth value change from frame to frame, which will typically lead to flickering artifacts in the rendered virtual views. Furthermore, encoding depth maps with such a temporal inconsistency problem would result in a higher bitrate, as the depth values are changing across time.

Figure 11:
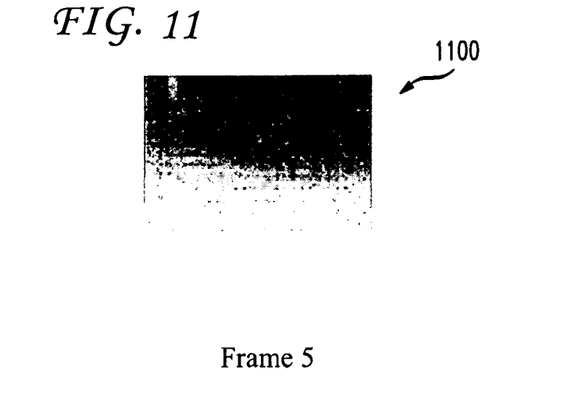
FIGS. 11, 12, and 13 are examples of depth maps around the floor region in the MPEG test sequence known as "Leaving_Laptop".
Figure 12:
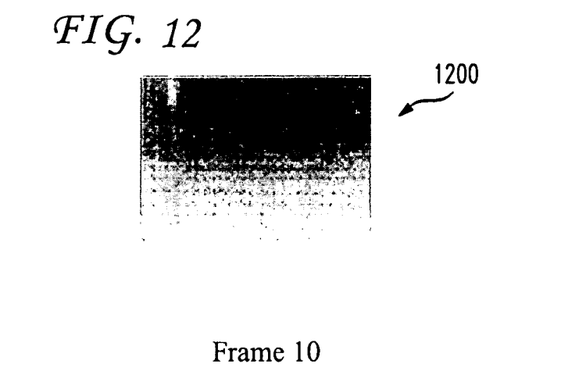
Figure 13:
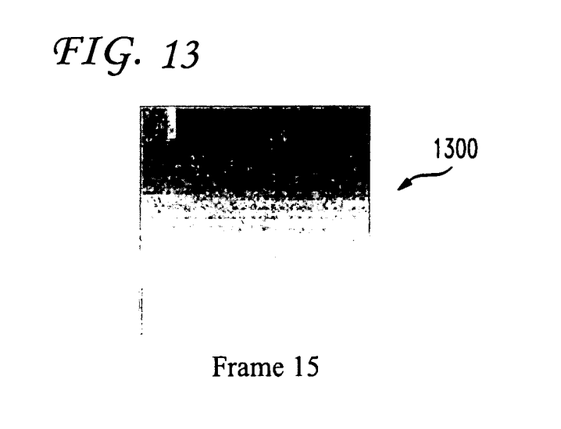

Another often observed depth map artifact is banding (false contours) in regions with smoothly varying depth values. FIGS. 11, 12, and 13 show respective exemplary depth maps around the floor region in the MPEG test sequence known as "Leaving_Laptop". In particular, FIG. 11 shows an exemplary depth map 1100 for frame 5; FIG. 12 shows an exemplary depth map 1200 for frame 10; and FIG. 13 shows an exemplary depth map 1300 for frame 15 of the MPEG test sequence "Leaving_Laptop". From FIGS. 11, 12, and 13, we see that the depth maps on the floor region exhibits some artificial contours. The depth values in such region should be changing smoothly. These contours could reduce the coding efficiency on depth maps because such patterns are typically harder to encode than the supposed smooth variation.

To address these problems, at least one implementation described in this disclosure proposes temporal filtering techniques for the estimated depth maps to improve the temporal consistency as well as to reduce or remove the false contours. The video information is used to identify corresponding regions for temporal filtering to be applied. The resulting depth maps, with improved temporal consistency and less banding (false contours), will provide higher rendering quality for the virtual views, and enable higher depth coding efficiency.

To improve temporal consistency and to remove artifacts in estimated depth maps, in at least one implementation, it is proposed to perform temporal filtering after an initial depth estimation has been performed (for example, after temporally independent depth maps are estimated). In this scenario, to filter (or, more generally, update) a depth map at a given timestamp, depth maps from both previous and future timestamps can be used. The temporal window of the depth maps that are to be involved in the filtering process can be determined by locating corresponding regions available in the depth maps at different timestamps. To identify corresponding regions at different timestamps, the motion information in the video view (instead of information in the depth) is used. Since the goal is to remove erroneous depth estimation results, such as changing boundaries of stationary regions and artificial contours, a filtering operation(s) with low-pass characteristics is utilized in at least one implementation. For example, temporal weighted averaging and median filtering are some exemplary candidate processes. In the following, we will provide one possible embodiment of the ideas proposed that relate to temporal filtering of depth maps with motion information from video. A generic block diagram of the filtering process according to one embodiment of the present principles is provided in FIG. 3.

Embodiment Example

For a given view, let us denote $I(x,y,t)$ and $D(x,y,t)$ as the video luminance pixel value and the corresponding estimated depth map value at pixel location $(x,y)$ and time $t$, respectively. We presume that we want to perform temporal filtering for a region in D at time t: $\{D(x,y,t)|x_0 \leq x \leq x_1, y_0 \leq y \leq y_1\}$. The following steps describe how the temporal filtering is achieved.

1. Identify Corresponding Regions at Different Timestamps Based on Motion Information from Video:

In an embodiment, the identification of the corresponding regions at different timestamps based on motion information from video is performed using the motion analyzer 310 of FIG. 3.

Since it is known that the depth information could be erroneous, the co-located region in video frame $\{I(x,y,t)|x_0 \leq x \leq x_1, y_0 \leq y \leq y_1\}$ is used to extract motion information and establish correspondence across different times. Any conventional motion analysis techniques can be utilized for this purpose to identify corresponding regions between $I(x,y,t')$ and $I(x,y,t)$, where $t' \neq t$. For example, a simple block-based motion search as typically performed in video coding is one possible choice. A temporal boundary can be set up such that the filtering is performed within a reasonable temporal distance (for example $t-T \leq t' \leq t+T$). Due to moving objects, it is possible that a given region may not have a correspondence at some timestamps. This can possibly be detected by setting some threshold in the motion search cost function.

After this motion analysis stage, for the given video region $\{I(x,y,t)|x_0 \leq x \leq x_1, y_0 \leq y \leq y_1\}$, we obtain motion vectors $(mvx_{t'}, mvy_{t'})$ for the corresponding region between t and t', to identify candidate correspondences available at different timestamps t': $\{I(x,y,t')|x_0 \leq x-mvx_{t'} \leq x_1, y_0 \leq y-mvy_{t'} \leq y_1, t-T \leq t' \leq t+T\}$. Note that the depth correspondence for the given region $\{D(x,y,t)|x_0 \leq x \leq x_1, y_0 \leq y \leq y_1\}$ can be established using these motion vectors to obtain corresponding regions $\{D(x,y,t')|x_0 \leq x-mvx_{t'} \leq x_1, y_0 \leq y-mvy_{t'} \leq y_1, t-T \leq t' \leq t+T\}$. This operation will be performed in Step 3 (temporal averaging) described below.

2. Determine Filter Weights:

In an embodiment, the determination of the filter weights is performed using the weight calculator 320 of FIG. 3.

To perform filtering, each depth correspondence identified by copying the motion vectors found in Step 1 is given a weight $w_{t'}$. The filtered depth, within $(x_0 \leq x \leq x_1, y_0 \leq y \leq y_1)$ is $D''(x,y,t) = \Sigma w_{t'} \times D(x+mvx_{t'}, y+mvy_{t'}, t')$, where $\Sigma w_{t'} = 1$, and both summations are performed over t' falling within the selected time range of T. The simplest averaging method is to use uniform weighting where the weights w are the same regardless of the time t'. In at least one implementation, we also propose other properties to be considered when determining weights.

Motion Criterion:

For objects that remain static across multiple timestamps, their depth should not change. Thus, if it is observed that $(mvx_{t'}, mvy_{t'})$ are mostly zero, we have better confidence that applying temporal filtering can improve temporal consistency for this region in the depth map. On the other hand, a moving object may also change its depth across time. An insensitive temporal filter may introduce some error to the depth map. Based on this rationale, we can apply a larger weight w to the correspondence with smaller motion, and apply a smaller weight (or even w=0) to the correspondence with larger motion.

Temporal Distance Criterion:

Beside the motion criterion above, another thing worth considering is the temporal distance between t' and t. For a typical low-pass filtering scenario, the largest weight is commonly assigned to t'=t and the weights decrease as t' moves away from t. For example, weights $0.5 \times \{1, -2, 4, -2, 1\}$ can be assigned for $t'=\{t-2, t-1, t, t+1, t+2\}$. Note that if there are some timestamps at which no correspondence were found in Step 1, then the weights have to be adjusted accordingly to ensure $\Sigma w_{t'} = 1$. For example, if no match exists at t'=t+1, then the weights will become $0.25 \times \{1, -2, 4, 1\}$ for $t'=\{t-2, t-1, t, t+2\}$. Note that the use of negative weights allows, for example, the filter to have a frequency response approaching that of an ideal low-pass filter.

Special Case (Median Filter):

If the selected filter is a median filter, then for each pixel within $x_0 \leq x \leq x_1, y_0 \leq y \leq y_0$, the filtered value $D''(x,y,t)$ is the median of the pixels in the corresponding location(s) identified in Step 1. Note that in this case the filtering weights are assigned on a pixel basis since the temporal median of each pixel may not come from the same timestamp. Also note that a median filter can be described as a weighted filter with a weight of one on the median value.

3. Temporal Averaging:

In an embodiment, the temporal averaging is performed using the temporal filter 330 of FIG. 3.

To perform filtering for the given region $\{D(x,y,t')|x_0 \leq x \leq x_1, y_0 \leq y \leq y_1\}$, the corresponding regions $\{D(x,y,t')$ $|x_0 \leq x-mvx_{t'} \leq x_1, y_0 \leq y-mvy_{t'} \leq y_1, t-T \leq t' \leq t+T\}$ are obtained using the motion vectors ($mvx_{t'}$, $mvy_{t'}$) found in Step 1. Now as the weights $w_{t'}$ are determined, the filtered depth values D" can be calculated as follows, with the summation being made over the various values of t' that are selected within the timestamp range T:

$$D''(x,y,t) = \Sigma w_{t'} \times D(x+mvx_{t'}, y+mvy_{t'}, t'), \text{ where } \Sigma w_{t'} = 1$$

The filtered depth values will replace the initial depth values in order to generate the filtered depth maps.

After filtering is done for the entire depth map D(x,y,t) at time t, the procedure will be repeated for the next depth map at t+1. Note that at this point, one can use the already filtered map D"(x,y,t) to perform filtering for D(x,y,t+1), or instead use the original D(x,y,t). Both methods can be considered for a general purpose. To avoid the potential problem of over filtering, one implementation uses the initial depth maps for filtering the depth map at t+1. In contrast, another implementation uses the already filtered map in an effort to provide greater continuity between earlier depth maps and the current depth map.

Figure 14:
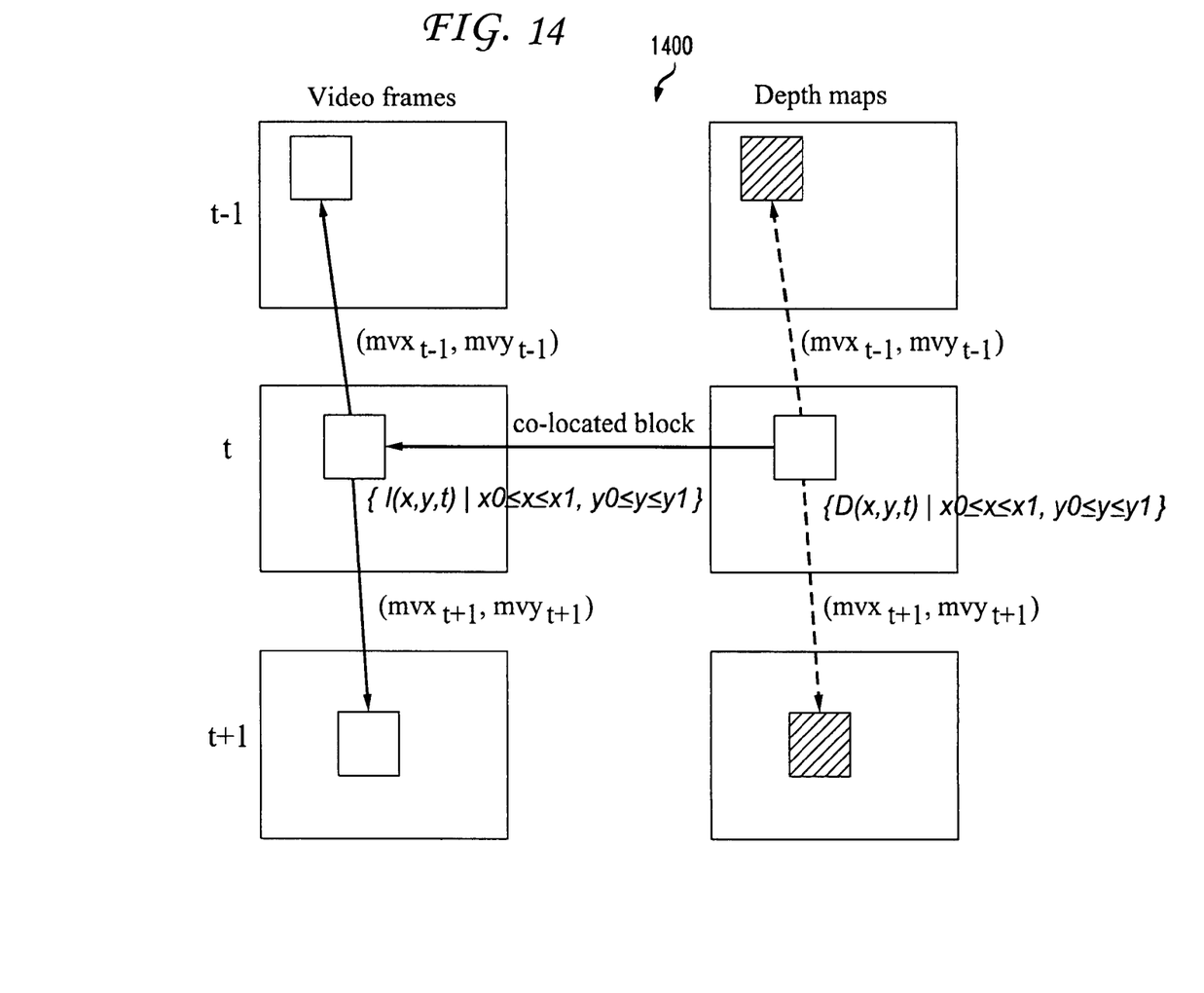
FIG. 14 illustrates an example of a filtering operation applied to a region within the depth map D at time t using its two corresponding regions at time t−1 and time t+1.

FIG. 14 illustrates an example of a filtering operation applied to a region within the depth map D at time t using its two corresponding regions at time t−1 and time t+1, and also depicts the relationship between different regions, in accordance with an embodiment of the present principles. For the given depth region, its co-located region within the video frame I at time t is first obtained. Then, motion analysis is performed to identify correspondence between this co-located video region and regions in other video frames, with motion vectors ($mvx_{t-1}$, $mvy_{t-1}$) and ($mvx_{t+1}$, $mvy_{t+1}$) as output. The corresponding regions in depth maps at time t−1 and time t+1, depicted with diagonal stripes, are obtained using these motion vectors. Finally, the filter weights will be applied to the corresponding depth regions (diagonal stripes), and possibly to the given depth region at time t, to compute the filtered value for the given depth region at time t.

Figure 15:
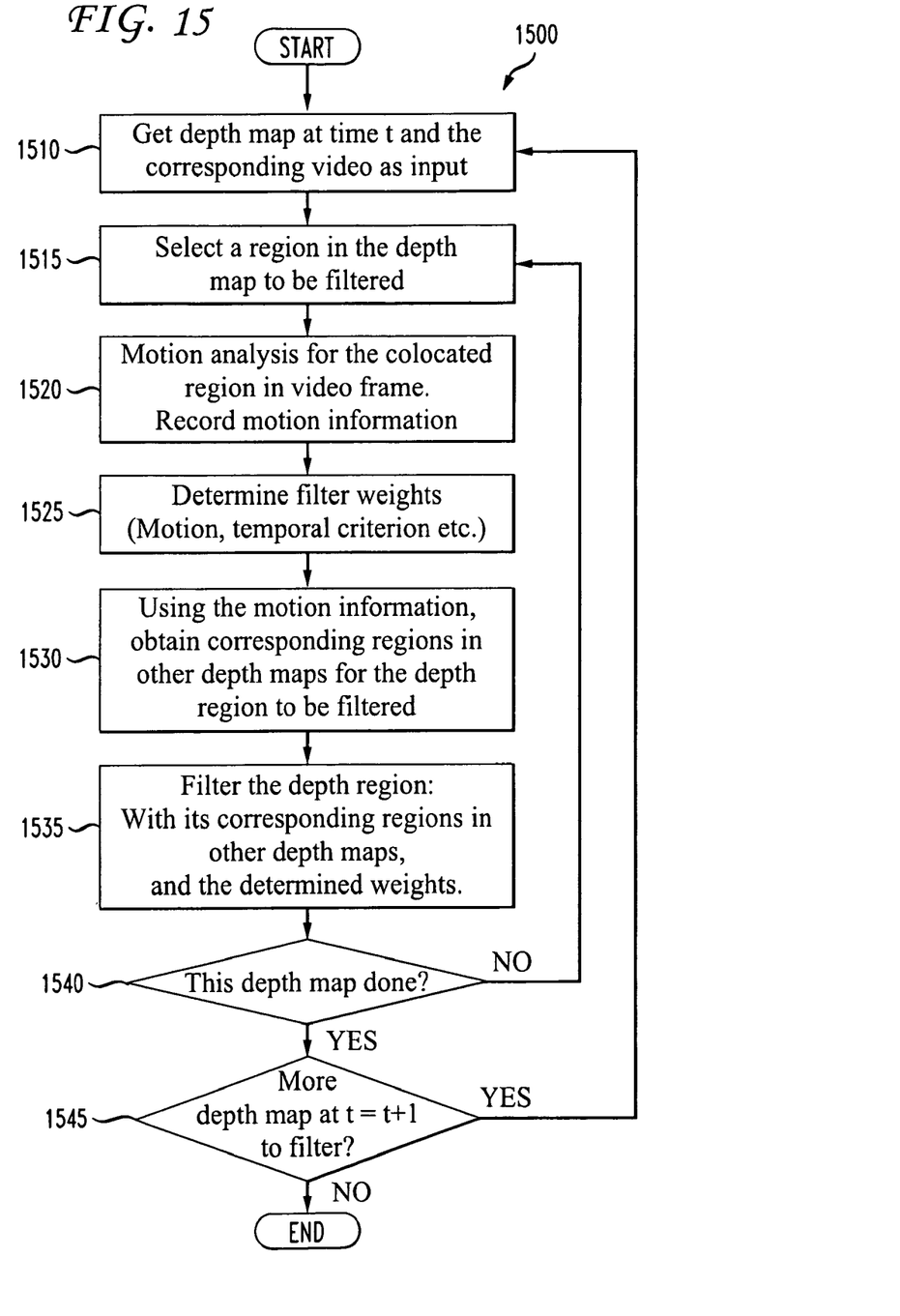
FIG. 15 is a diagram of an implementation of a method for performing temporal filtering of depth maps.

FIG. 15 shows an exemplary method for performing temporal filtering of depth maps, in accordance with an embodiment of the present principles. At step 1510, the depth map at time t and the corresponding video are obtained as inputs. At step 1515, a region in the depth map to be filtered is selected. At step 1520, motion analysis for the co-located region in the video frame is performed, and the resultant motion information is recorded. At step 1525, filter weights are determined (e.g., based on motion, temporal criteria, and so forth). At step 1530, using the motion information, the corresponding regions in the other depth maps are obtained for the depth region to be filtered. At step 1535, the region is filtered along with its corresponding regions in the other depth maps and using the determined weights. At step 1540, it is determined whether or not the current depth map is done. If so, then control is passed to a step 1545. Otherwise, control is returned to the step 1515. At step 1545, it is determined whether or not there are more depth maps at t=t+1 to filter. If so, then control is returned to the step 1510. Otherwise, the method is terminated.

As noted earlier, the operation of filtering may be referred to as updating. Regardless of the term used, the operation of filtering/updating a given portion of a depth map may involve accessing and using depth values from other depth maps. Indeed, in various implementations, filtering/updating a given portion of a given depth map only involves accessing and using depth values from other depth maps because the given depth map is not considered.

Various implementations update a given portion of a depth map by using depth maps from other views at the same timestamp, and/or depth maps from other views at different timestamps. The depth maps from other views may be used in addition to, or in lieu of, depth maps from the same view at different timestamps. Certain implementations that use depth maps from the same view are able to address, for example, the problem of flickering. Similarly, the use of depth maps from different views may be particularly suited to addressing one or more specific artifacts or types of noise.

Various implementations filter/update measured depth maps, in which the depth values have been measured rather than estimated. Measured depth maps may exhibit different artifacts from estimated depth maps. However, the present principles may provide the same or additional advantages, particularly if different equipment is used to measure different depth maps. The equipment may be different, for example, if different views are considered, or if equipment was changed for a given view, or if a given view has multiple measuring devices that are used under different conditions.

We have described certain implementations that determine a motion vector for a video block, and use that same motion vector to find a correspondence between depth maps to perform a filtering operation on a depth block. However, other implementations use a variation of the motion vector instead of, in or in addition to, the exact motion vector, to find correspondence between depth maps to perform the filtering operation. For example, in one implementation, the exact motion vector is used to find a correspondence between depth maps, but then that motion vector is modified so that a different correspondence is determined. Then both of the correspondences are used in the filtering operation. Such an implementation provides a larger correspondence and, therefore, provides more candidates for the filtering operation. One such modification of a motion vector is to vary the motion vector slightly so that the correspondence points to a different area that is still in the same object or area (for example, foreground or background).

In this application the term motion vector is typically applied to a given block at a time t to indicate the motion of that block with respect to a picture at a different time (for example, having a different timestamp). The motion vector, however, is understood to characterize the relative motion between the two pictures. Therefore, the motion vector applies to the corresponding blocks in both of the pictures.

Several of the implementations and features described in this application may be used in the context of the H.264/MPEG-4 AVC (AVC) Standard, or the AVC standard with the MVC extension, or the AVC standard with the SVC extension. However, these implementations and features may be used in the context of another standard (existing or future), or in a context that does not involve a standard. We thus provide one or more implementations having particular features and aspects. However, features and aspects of described implementations may also be adapted for other implementations.

Additionally, many implementations may be implemented in one or more of an encoder, a decoder, a processor (e.g., a post-processor processing output from a decoder, a pre-processor providing input to an encoder, etc.), and so forth. In at least one implementation, updating the depth values may be performed before encoding depth. In at least one other implementation, depth is not calculated at the encoder, but rather is calculated a receiver/television or at the video source without encoding and transmitting the depth. Instead, only the video may be transmitted with no depth images. Then, for example, the receiver can estimate depth because the receiver wants to be able to render new views for a television that is connected to the receiver. Further, other implementations are contemplated by this disclosure.

We thus provide one or more implementations having particular features and aspects. However, features and aspects of described implementations may also be adapted for other implementations. Implementations may signal information using a variety of techniques including, but not limited to, SEI messages, slice headers, other high level syntax, non-high-level syntax, out-of-band information, datastream data, and implicit signaling. Accordingly, although implementations described herein may be described in a particular context, such descriptions should in no way be taken as limiting the features and concepts to such implementations or contexts.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer, for example, to all or part of a still image or all or part of a picture from a video sequence. As is known, a picture may be a frame or a field. Additionally, as used herein, a picture may also be a subset of a frame such as, for example, a top half of a frame or a single macroblock. As another example, a depth picture may be, for example, a complete depth map or a partial depth map that only includes depth information for, for example, a single macroblock of a corresponding video frame.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations, such as syntax or a depth map or parameters for processing one or more depth maps. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

The invention claimed is:

1. A method comprising:
accessing a first depth picture that corresponds to a first video picture;
determining, for a given portion of the first depth picture, a co-located video portion of the first video picture;
accessing a video motion vector indicating motion of the co-located video portion of the first video picture with respect to a second video picture;
accessing a second depth picture that corresponds to the second video picture;
determining a depth portion of the second depth picture, from the given portion of the first depth picture, based on the video motion vector; and wherein the depth portion of the second depth picture is determined by applying filter weights to the given portion of the first depth picture, and a value of a particular one of the filter weights decreases as a temporal distance between the second picture and the first picture increases; and the value of the particular one of the filter weights increases as the motion indicated by the motion vector decreases.

2. The method of claim 1 wherein the second video picture has a timestamp different from a timestamp of the first video picture.

3. The method of claim 1, wherein the method is implemented in one or more of a video encoder, a pre-processor for the video encoder, a post-processor for the video encoder, a video decoder, a pre-processor for the video decoder, or a post-processor for the video decoder.

4. The method of claim 1 further comprising determining the video motion vector.

5. The method of claim 1 further comprising
accessing a different video motion vector indicating motion of the co-located video portion of the first video picture with respect to a third video picture;
accessing a third depth picture that corresponds to the third video picture; and
determining a depth portion of the third depth picture, from the given portion of the first depth picture, based on the different video motion vector, and
wherein updating the given portion of the first depth picture is further based on the depth portion of the third depth picture as well as the depth portion of the second depth picture.

6. A non-transitory processor readable medium having stored therein instructions for causing a processor to perform at least the following:
accessing a first depth picture that corresponds to a first video picture;
determining, for a given portion of the first depth picture, a co-located video portion of the first video picture;
accessing a video motion vector indicating motion of the co-located video portion of the first video picture with respect to a second video picture;
accessing a second depth picture that corresponds to the second video picture;
determining a depth portion of the second depth picture, from the given portion of the first depth picture, based on the video motion vector; and wherein the depth portion of the second depth picture is determined by applying filter weights to the given portion of the first depth picture and a value of a particular one of the filter weights decreases as a temporal distance between the second picture and the first picture increases; and the value of the particular one of the filter weights increases as the motion indicated by the motion vector decreases.

7. An apparatus, comprising a processor configured to perform at least the following instructions stored on a non-transitory computer readable medium:
accessing a first depth picture that corresponds to a first video picture;
determining, for a given portion of the first depth picture, a co-located video portion of the first video picture;
accessing a video motion vector indicating motion of the co-located video portion of the first video picture with respect to a second video picture;
accessing a second depth picture that corresponds to the second video picture;
determining a depth portion of the second depth picture, from the given portion of the first depth picture, based on the video motion vector; and wherein the depth portion of the second depth picture is determined by applying filter weights to the given portion of the first depth picture and a value of a particular one of the filter weights decreases as a temporal distance between the second picture and the first picture increases; and the value of the particular one of the filter weights increases as the motion indicated by the motion vector decreases.

8. An apparatus comprising:
a temporal filter for accessing a first depth picture that corresponds to a first video picture, and for accessing a second depth picture that corresponds to a second video picture; and
a motion analyzer for determining a video motion vector for a co-located video portion of the first video picture, the co-located video portion of the first video picture corresponding to a given portion of the first depth picture, and the video motion vector indicating motion of the co-located video portion of the first video picture with respect to the second video picture,
wherein the temporal filter determines a depth portion of the second depth picture, from the given portion of the first depth picture, based on the video motion vector; and wherein the depth portion of the second depth picture is determined by applying filter weights to the given portion of the first depth picture and that a value of a particular one of the filter weights decreases as a temporal distance between the second picture and the first picture increases; and the value of the particular one of the filter weights increases as the motion indicated by the motion vector decreases.

9. The method of claim 1, wherein the filter weights corresponds to a selected region in the depth map.

10. The method of claim 9, wherein the depth map is obtained at a first time.

11. The method of claim 10, wherein said a plurality of filters can be used, each corresponds to other regions in other depth maps.

12. The method of claim 5 wherein the second video picture has a timestamp different from a timestamp of the first video picture.

13. The method of claim 5, wherein the method is implemented in one or more of a video encoder, a pre-processor for the video encoder, a post-processor for the video encoder, a video decoder, a pre-processor for the video decoder, or a post-processor for the video decoder.

14. The apparatus of claim 8, wherein the filter weights corresponds to a selected region in the depth map.

15. The apparatus of claim 8, wherein the depth map is obtained at a first time.

16. The apparatus of claim method of claim 15, wherein said a plurality of filters can be used, each corresponds to other regions in other depth maps.

17. The apparatus of claim 16 wherein the second video picture has a timestamp different from a timestamp of the first video picture.

18. The apparatus of claim 16, wherein the method is implemented in one or more of a video encoder, a pre-processor for the video encoder, a post-processor for the video encoder, a video decoder, a pre-processor for the video decoder, or a post-processor for the video decoder.

* * * * *